(12) United States Patent  (10) Patent No.: US 8,469,559 B2
Williams  (45) Date of Patent: Jun. 25, 2013

(54) EDGE-LIT LIGHTING PRODUCT

(75) Inventor: Benjamin P. Williams, Houlton, WI (US)

(73) Assignee: Target Brands, Inc., Minneapolis, MN (US)

( * ) Notice: Subject to any disclaimer, the term of this patent is extended or adjusted under 35 U.S.C. 154(b) by 205 days.

(21) Appl. No.: 13/073,648

(22) Filed: Mar. 28, 2011

(65) Prior Publication Data

US 2012/0250346 A1  Oct. 4, 2012

(51) Int. Cl.
  *F21V 21/00*  (2006.01)
(52) U.S. Cl.
  USPC ............ 362/395; 362/296.05; 362/311.06
(58) Field of Classification Search
  USPC .......... 362/395, 101, 296.05, 311.01, 311.02, 362/311.06, 334, 235, 582, 628
  See application file for complete search history.

(56) References Cited

U.S. PATENT DOCUMENTS

| | | | |
|---|---|---|---|
| 1,121,242 A | 12/1914 | Gese | |
| 3,699,915 A * | 10/1972 | Greene | 362/26 |
| D238,960 S | 2/1976 | Leung et al. | |
| D398,416 S | 9/1998 | Huang | |
| D420,165 S | 2/2000 | Chiu | |
| 6,356,394 B1 * | 3/2002 | Glienicke | 359/641 |
| 6,568,821 B1 | 5/2003 | Page et al. | |
| 6,705,747 B2 | 3/2004 | Caferro et al. | |
| 6,971,781 B2 | 12/2005 | Guy | |
| 6,988,815 B1 | 1/2006 | Rizkin et al. | |
| 6,994,462 B2 | 2/2006 | Pesenti | |
| D517,239 S | 3/2006 | Starck | |
| 7,052,157 B1 | 5/2006 | Lau | |
| 7,134,768 B2 * | 11/2006 | Suzuki | 362/241 |
| 7,229,196 B2 | 6/2007 | Hulse | |
| 7,246,932 B2 | 7/2007 | Burtsev et al. | |
| 7,311,433 B2 * | 12/2007 | Chen et al. | 362/617 |
| D575,897 S | 8/2008 | Dordoni | |
| 7,581,862 B2 * | 9/2009 | Stefanov et al. | 362/555 |
| 7,631,996 B2 | 12/2009 | Huang | |
| 7,784,967 B2 | 8/2010 | Lodhie | |
| 2007/0030693 A1 | 2/2007 | Karlsson | |
| 2009/0223436 A1 * | 9/2009 | Werman et al. | 116/286 |
| 2010/0148688 A1 | 6/2010 | Hikmet et al. | |

OTHER PUBLICATIONS

Wang, Tacy LEDinside, "Global Lighting Technologies offering new range of LED-based edge-lit illumination solutions," Feb. 23, 2010, 2 pages.
Starscape, "Edge lit transparent Acrylic panels," http://www.starscape.co.uk/acrylic_panels_html. Oct. 13, 2010. 4 pages.

* cited by examiner

*Primary Examiner* — Julie Shallenberger
(74) *Attorney, Agent, or Firm* — Leanne Taveggia Farrell; Westman, Champlin & Kelly, P.A.

(57) ABSTRACT

An edge-lit lighting product or luminaire includes a light guide made of a single, transparent material and demonstrates properties of total internal reflection with respect to a surrounding environment. The light guide has a thickness and includes a proximal edge, a distal edge and a boundary surface. The proximal edge receives light from a light source. The distal edge is spaced apart from the proximal edge, is configured to emit at least a portion of the light from the light source, spans across a first distance and has a substantially axial symmetric surface. The first distance is greater than the thickness of the light guide. The boundary surface extends between the proximal edge and the distal edge and defines a boundary between the single, transparent material of the light guide and the surrounding environment of the light guide. At least a portion of the boundary surface is curved.

18 Claims, 7 Drawing Sheets

EDGE-LIT LIGHTING PRODUCT

BACKGROUND

Total internal reflection (TIR) is an optical event where light cannot pass through a boundary and is totally reflected. For TIR to occur, light strikes a boundary between two media at an angle larger than a critical angle, where the critical angle is a function of the refractive indices of the two media. The critical angle is measured with respect to the normal to the boundary.

The discussion above is merely provided for general background information and is not intended to be used as an aid in determining the scope of the claimed subject matter.

SUMMARY

An edge-lit lighting product, luminaire or table lamp includes a light guide or substrate made of a single, transparent material and demonstrates properties of total internal reflection (TIR) with respect to a surrounding environment. The light guide has a thickness and includes a proximal or base edge, a distal or free edge and a boundary surface. The light guide or substrate can also be defined as having a base section or base portion including the proximal or base edge, an elongated section or shade portion including the distal or free edge and a curved section or shade support structure coupling the elongated section to the base section.

The proximal or base edge receives light from a light source. The distal edge is spaced apart from the proximal edge and is configured to emit at least a portion of the light from the light source to illuminate an area in close proximity to the edge-lit lighting product. The distal edge spans across a first distance and has a substantially axial symmetric surface. The first distance is greater than the thickness of the light guide. The boundary surface extends between the proximal edge and the distal edge and defines a boundary between the single, transparent material of the light guide and the surrounding environment of the light guide. At least a portion of the boundary surface is curved.

A method is also provided for illuminating a space. Light is projected from the light source through the proximal edge of the substrate. The light is guided through the substrate using properties of TIR. At least a portion of light traveling through the substrate is emitted at the distal edge.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Embodiments are described as an edge-lit lighting product, e.g., a luminaire, for creating artificial light using a light source. For example, an edge-lit lighting product or luminaire can be a free-standing table lamp, floor lamp, task lamp or the like, or a fixed wall lamp, sconce, pendant, chandelier or the like. The edge-lit lighting product includes a light guide or substrate made of a single, transparent material. The light guide uses properties of total internal reflection (TIR) with respect to its surrounding environment to allow light to travel from the light source to a remotely located or spaced apart light emitting edge. A boundary surface of the light guide acts as a boundary between the single, transparent material of the light guide and the environment surrounding the material. At least a portion of the boundary surface of the light guide is curved.

Figure 1:
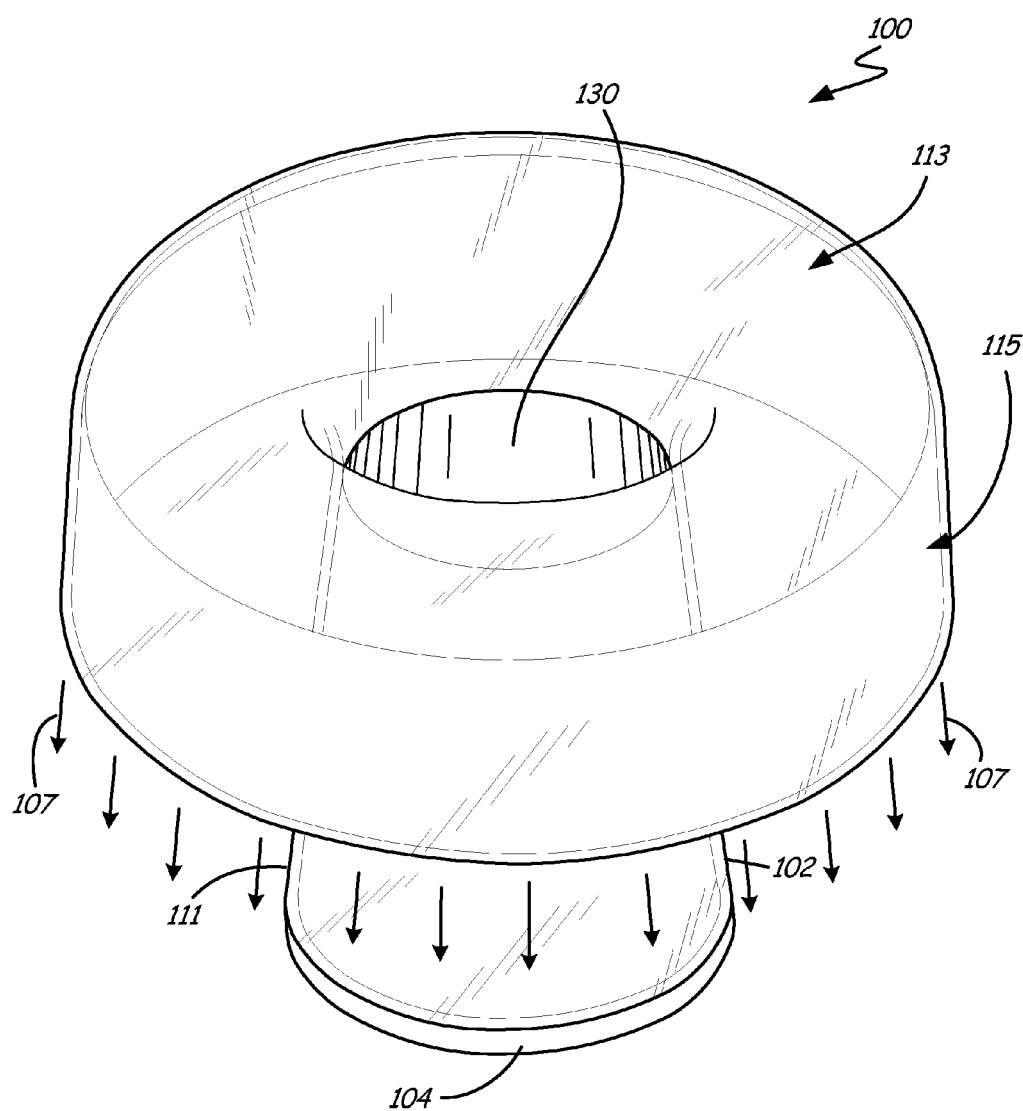
FIG. 1 illustrates a perspective view of an edge-lit lighting product in accordance with one embodiment.

FIG. 1 illustrates a perspective view of an exemplary edge-lit lighting product 100 in accordance with one embodiment. More specifically, FIG. 1 illustrates a luminaire 100 including a light guide or substrate 102 made of a single, transparent material and a light source 104 that is located remotely from or spaced apart from a location 108 where light (illustrated as arrowed lines 107) is emitted. The emitted light is configured to illuminate an area or space in close proximity to the edge-lit lighting product 100. Light source 104 can be any type of lamp or lamps that produces light from electricity. For example, light source 104 can be a plurality of LEDs (light emitting diodes) 103 (FIGS. 2-4), incandescent or fluorescent light bulbs or other similar replaceable lamp components that together project light at a level that is about 200 lumens or greater. The plurality of LEDs, incandescent or fluorescent light bulbs or other similar replaceable lamp components can, but not necessarily, combine together to spread, to substantially evenly distribute or otherwise blend their illumination to form light source 104.

The single, transparent material of light guide or substrate 102 demonstrates properties of TIR with respect to its surrounding environment (i.e., an index of refraction of the single, transparent material is greater than an index of refraction of the surrounding environment). For example, the single, transparent material can be an optical grade acrylic, glass or polycarbonate and the surrounding environment can be air. However, other materials or media and other types of surrounding environments with similar properties may be used. In addition, the single, transparent material of light guide or substrate 102 can be formed using any of a variety manufacturing processes. For example, light guide or substrate 102 can be formed by thermoforming or by other types of molding including injection molding, blow molding or rotational molding.

Figure 2:
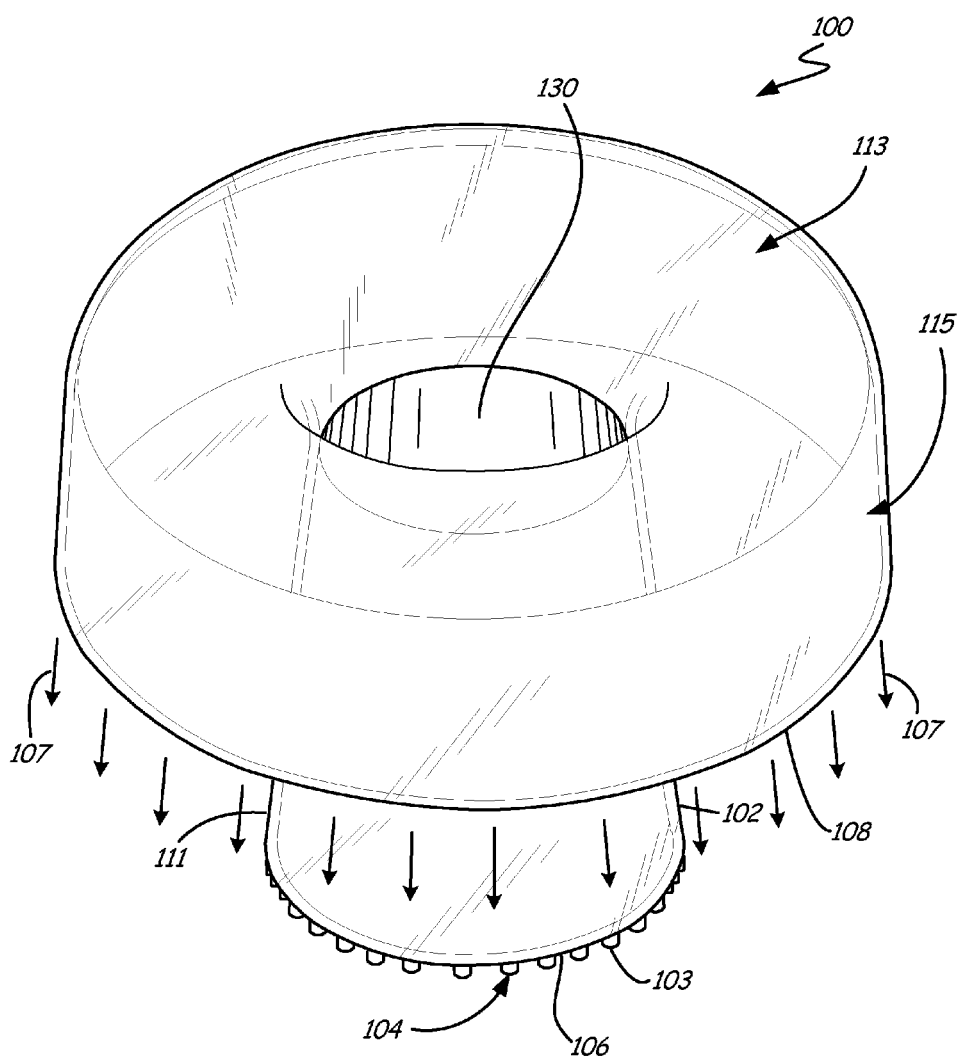
FIG. 2 illustrates a perspective view of the edge-lit lighting product of FIG. 1 including a plurality of LEDs (light emitting diodes).
Figure 3:
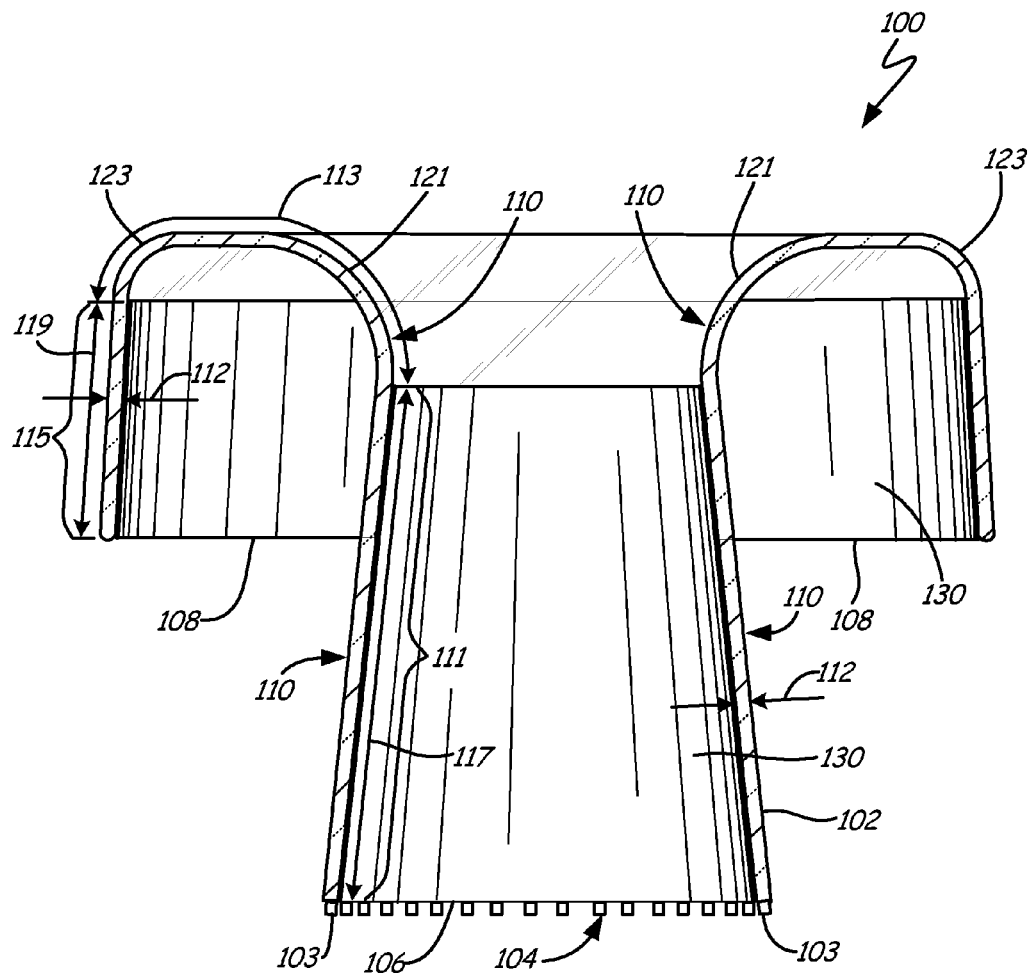
FIG. 3 illustrates a sectional side view of the edge-lit lighting product illustrated in FIG. 2.

FIG. 2 illustrates a perspective view of an embodiment of exemplary edge-lit lighting product 100 where light source 104 includes a plurality of LEDs 103. FIG. 3 illustrates a sectional side view of the exemplary edge-lit lighting product 100 illustrated in FIG. 2. In FIGS. 2 and 3, LEDs 103 are schematically illustrated. Light guide or substrate 102 includes a proximal edge or base edge 106 that receives light from light source 104 and a distal edge or free edge 108 that emits at least a portion of the light received from light source 104. The plurality of LEDs 103 of light source 104 are located adjacent to proximal edge 106 and arranged or spaced substantially evenly apart about proximal edge 106 as illustrated. Distal edge 108 is remotely located or spaced apart from proximal edge 106. A boundary surface 110 located on both sides of light guide 102 extends between proximal edge 106 and distal edge 108 and defines a boundary between the single, transparent material of light guide 102 and the surrounding environment. At least a portion of the boundary surface 110 is curved.

Light guide or substrate 102 and therefore edge-lit lighting product or luminaire 100 can also be defined as including a base section 111, a curved section 113 and an elongated section 115. Base section 111 can be further defined as being aesthetically similar to a decorative base portion or body portion of a free-standing lamp, such as a table or floor lamp, or other type of fixed lamp, such as a sconce. However, rather than supporting or providing a socket for holding a lamp or light source, base section or base portion 111 includes proximal edge or base edge 106 for receiving light from light source 104. As illustrated, base section 111 extends along a linear path defining a conical shape and extends for a base section length 117. Therefore, LEDs 103 are radially arranged or spaced substantially evenly apart about the circumferential proximal edge 106. Base section 111 further provides the support structure for curved section 113 and elongated section 115.

Elongated section 115 can be further defined as being aesthetically similar to a lampshade or shade portion of a table or floor lamp. However, rather than shading or intercepting light from a lamp or lamp component, elongated section or shade portion 115 includes distal edge or free edge 108 for emitting light from light source 104 to illuminate an area or space in close proximity to luminaire 100. As illustrated, elongated section or shade portion 115 extends along a linear path for an elongated section length 119. This length 119 directs light to distal edge 108 for emission.

Curved section 113 can be further defined as being aesthetically similar to a lampshade or shade support structure of a table or floor lamp. However, rather than supporting a structure for shading or intercepting light, curved section or shade support structure 113 directs light traveling through base section or base portion 111 to elongated section or shade portion 115. More particularly, curved section or shade support structure 113 couples the base section or base portion 111 to the elongated section or shade portion 115 and includes at least one curve 121, 123.

As illustrated in FIG. 3, boundary surface 110 of exemplary edge-lit lighting product or luminaire 100 and therefore also curved section 113 includes a first curve 121. First curve 121 includes a first radius of curvature. For example and as illustrated, first curve 121 includes a first radius of curvature of about 2.25 inches. Boundary surface 110 and therefore also curved section 113 also includes a second curve 123. Second curve 123 includes a second radius of curvature. For example, and as illustrated, second curve 123 includes a second radius of curvature of about 1.25 inches.

TIR is an optical concept where, under certain conditions, light cannot pass through a boundary and is totally reflected. For TIR to occur, light strikes a boundary between two media at an angle of incidence larger than a particular critical angle and the refractive index of the media on the other side of the boundary is lower than the refractive index of the media the light is traveling through. Both the angle of incidence and the critical angle are measured with respect to the normal to the boundary and the critical angle is dependent on the refractive indices of the two media separated by the boundary.

Figure 4:
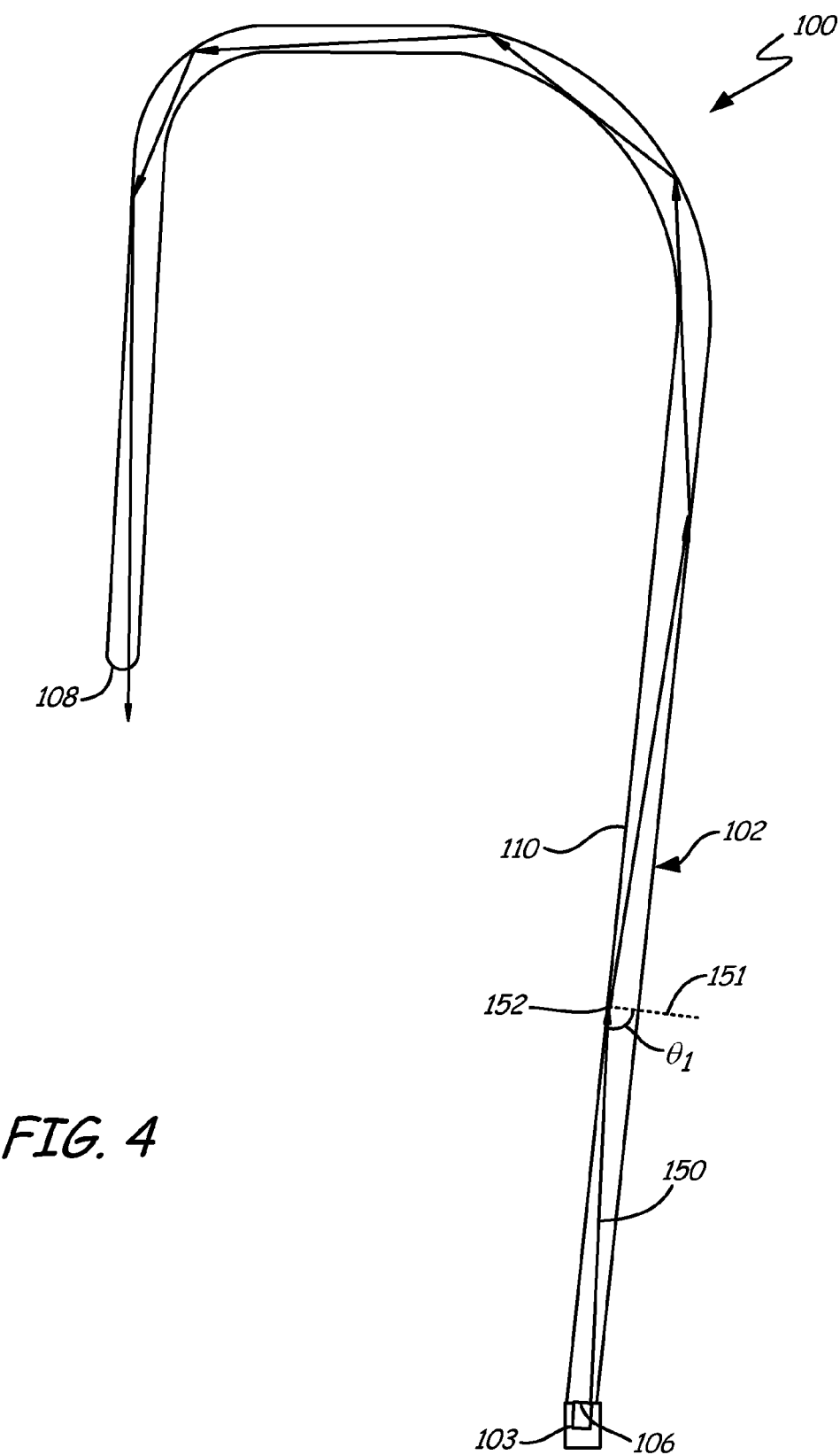
FIG. 4 illustrates a schematic diagram of a light beam traveling through the light guide of the edge-lit lighting product illustrated in FIGS. 1-3.

FIG. 4 illustrates a schematic diagram of a beam of light 150 generated from light source 104 and guided through light guide or substrate 102 of edge-lit lighting product 100 under TIR. As illustrated, light beam 150 strikes a boundary or, in this case, boundary surface 110 at an angle of incidence with respect to the normal 151 to the boundary. As illustrated, at a first point of incidence 152, light beam 150 strikes boundary surface 110 at a first angle of incidence $\theta_1$. Under TIR, first angle of incidence $\theta_1$ is greater than a critical angle of incidence and the refractive index of the single, transparent material of light guide 102 is greater than the refractive index of the surrounding environment. Therefore, beam of light 150 totally reflects back into light guide 102 at the boundary. For example, when light guide 102 is made of acrylic and the surrounding environment is air, the angle at which light beam 150 strikes the boundary has an angle of incidence ($\theta$) that is greater than a critical angle about equal to 41 degrees in order to totally reflect. If the angle of incidence is less than 41 degrees, some or the entire light beam will refract and transmit through the boundary.

For the entire beam of light 150 to travel from proximal edge 106 and be emitted at distal edge 108, each incidence of light beam 150 against the boundary or boundary surface 110 must be totally reflected. It should be realized, however, that a loss of light through light guide 102 from proximal edge 106 to distal edge 108 can occur and, in fact, is expected. For example and as discussed above, light can be lost along boundary surface 110 due to refraction or transmission because the angle of incidence is less than the critical angle. In another example, light directed through light guide can degrade due to scattering and/or absorption within the light guide. In particular, there is a 0.5% light degradation for every 1 inch a beam of light travels through transparent acrylic. Therefore, if light guide 102 extends from proximal edge 106 to distal edge 108 a length of 18 inches, a 9% light degradation can be expected. In the embodiment illustrated in FIGS. 1-7, light degradation can be expected to be about equal to 17%.

Figure 5:
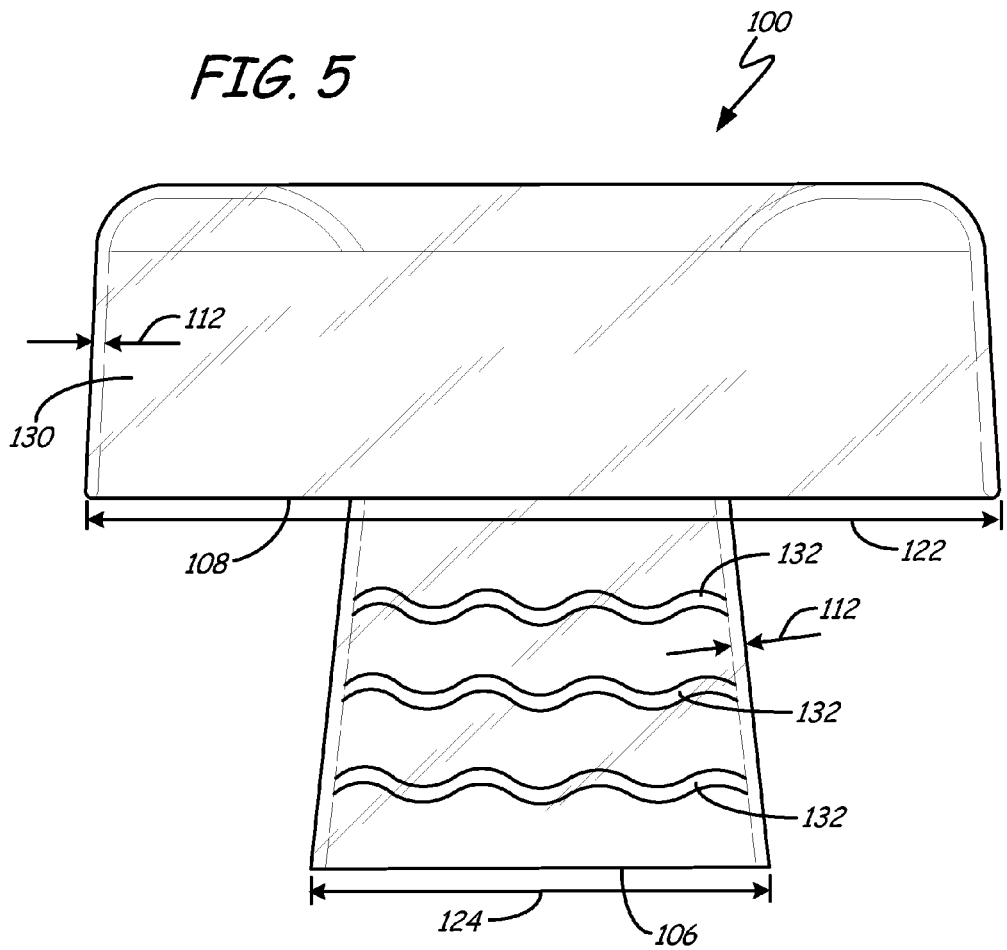
FIG. 5 is a side view of an edge-lit lighting product in accordance with another embodiment.

As illustrated in FIGS. 2-3 and in the side view of the exemplary edge-lit lighting product 100 of FIG. 5, the single, transparent material of light guide or substrate 102 includes a thickness 112. As illustrated in section in FIG. 3 and in lighter weight lines in FIG. 5, distal edge or free edge 108 has a substantially axial symmetric surface. An axial symmetric surface is a surface that is unchanged or axially symmetric about an axis. As also illustrated in section in FIG. 3 and in lighter weight lines in FIG. 5, proximal edge or base edge 106 has a substantially flat proximal edge surface. More particularly, when light from light source 104 is projected into light guide 102 at proximal edge 106, the light is oriented substantially normal or perpendicular to the proximal edge surface. In this orientation, about 4% of light is reflected from light source 104 into light guide 102. The remaining about 96% of light from light source 104 is transmitted or projected into light guide 102.

Figure 6:
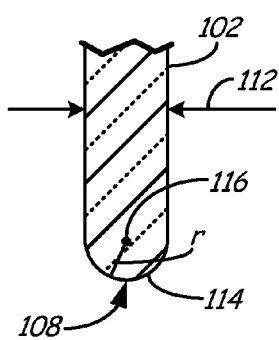
FIG. 6 is an enlarged sectional side view of a distal edge of the edge-lit lighting product illustrated in FIGS. 1-4.

FIG. 6 is an enlarged view of a distal edge surface 114 of distal edge 108 as illustrated in section. In FIG. 6, distal edge surface 114 is symmetric about axis 116 and follows a symmetric curve corresponding to r. Providing or polishing distal edge 108 so as to create an axial symmetric surface 114 allows light in light guide 102 to be emitted at distal edge 108. More particularly, providing or polishing distal edge 108 with an axial symmetric surface 114 provides distal edge 108 with a lens shape so as to transmit and refract light by converging or diverging beams of light. Therefore, because distal edge surface 114 is spaced a distance r from axis 116, thickness 112 of light guide or substrate 102 is substantially equal to 2r (i.e., twice the distance r).

Figure 7:
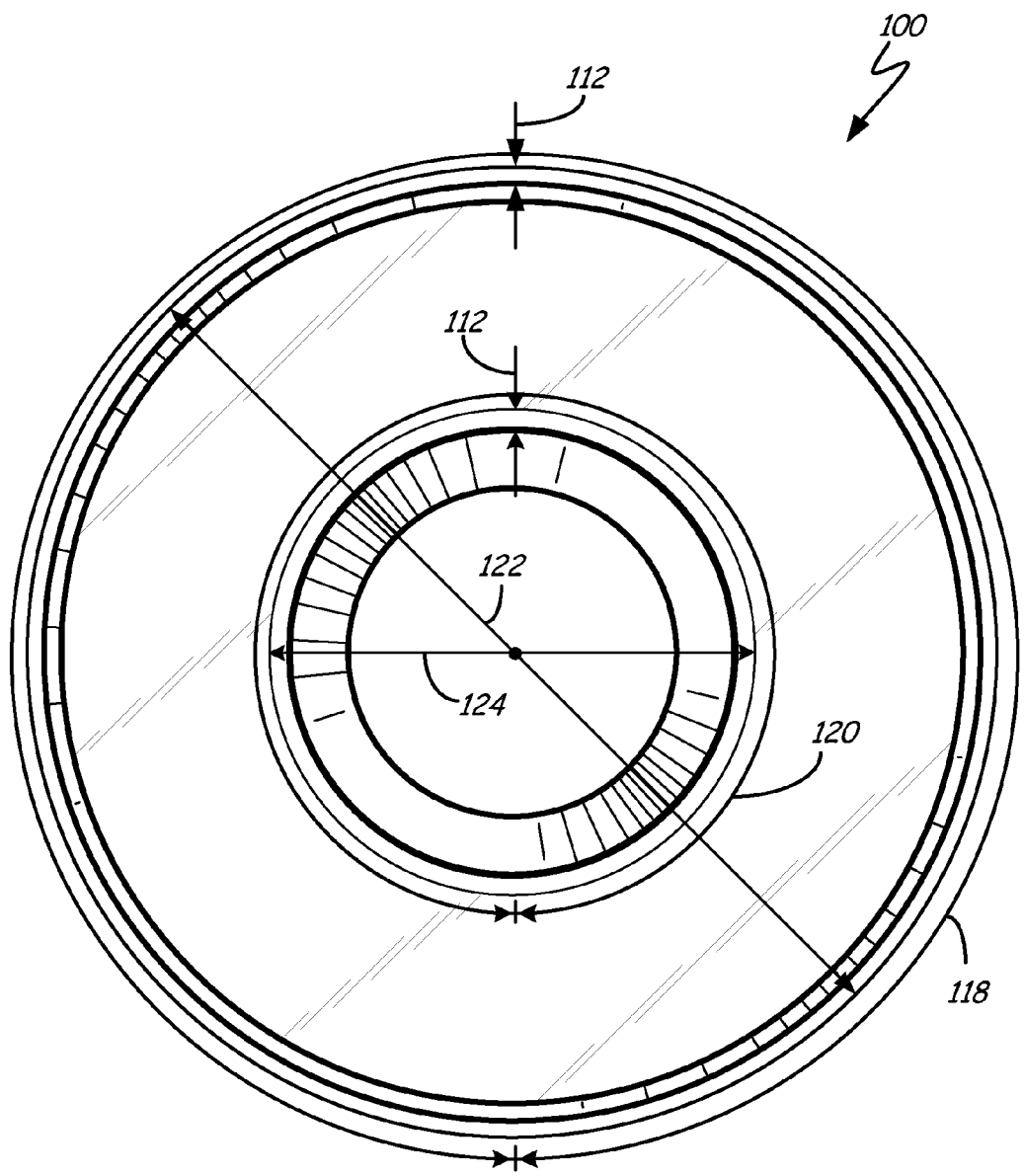
FIG. 7 illustrates a bottom view of the edge-lit lighting product illustrated in FIG. 5 with the light source removed for illustrative purposes.

Distal edge 108 of light guide or substrate 102 includes a first diameter 122 (FIGS. 5 and 7), while proximal edge 106 of light guide or substrate 102 includes a second diameter 124 (FIGS. 5 and 7). Using diameter dimensions 122 and 124, the distance which distal edge 108 and proximal edge 106 span can be determined. More specifically, to determine the distance for which proximal edge 106 and distal edge 108 span, the first diameter dimension 122 can be used to calculate an outer circumference of distal edge 108 and an outer circumference of proximal edge 106 and therefore determine a first distance 118 distal edge 108 spans and a second distance 120 proximal edge 106 spans. In one embodiment and as illustrated in FIG. 7, both first distance 118 and second distance 120 are greater than thickness 112 of light guide or substrate 102.

While in some embodiments, as in FIGS. 1-7, first distance 118 and second distance 120 can be circumferential dimensions, in other embodiments first distance 118 and second distance 120 can be rectilinear dimensions. In addition, while in some embodiments first distance 118 can be substantially similar to second distance 120 or first distance 118 can be less than second distance 120, in regards to exemplary edge-lit lighting product 100, first distance 118 is greater than second distance 120. More particularly and with reference back to FIG. 6, first distance 118 is greater than thickness 112 or greater than twice the radius r (the distance between axis 116 and axial symmetric distal edge surface 114). Even more specifically, first distance 118 is twice as large as thickness 112 or four times the radius r.

With reference to FIGS. 1, 2-3 and 5, at least a portion of boundary surface 110 of light guide or substrate 102 between proximal edge or base edge 106 and distal edge or free edge 108 is screen printed 130. For example, in FIGS. 1-3, the interior side of boundary surface 110 of base section 111 and the interior side of boundary surface 110 of elongated section 115 are screen printed, while in FIG. 5 only the interior surface of elongated section 115 is screen printed. Screen printing a boundary surface 110 of light guide 102 visually enhances the loss of light from light guide 102 whether the loss of light is caused by the light beams in the light guide having an incidence angle that is less than the critical angle, caused by a change in the critical angle due to a change in media or caused by some other reason. Screen printing 130 can be any of a variety of colors and patterns including white. In addition, although not specifically illustrated, not only can an interior surface of boundary surface be screen printed, but an exterior surface of boundary surface can also be screen printed.

With reference to FIG. 5, at least a portion of light guide or substrate 102 between proximal edge or base edge 106 and distal edge or free edge 108 includes one or more decals 132 affixed to boundary surface 110. The one or more decals 132 enhance the loss of light from light guide 102 whether the loss of light is caused by the light beams in the light guide having an incidence angle that is less than the critical angle, caused by a change in the critical angle due to a change in media or caused by some other reason. The one or more decals 132 can be made of vinyl and can be adhered to either an interior surface or an exterior surface of boundary surface 110 using an adhesive. In addition, decals 132 can be any of variety colors or patterns including white.

Figure 8:
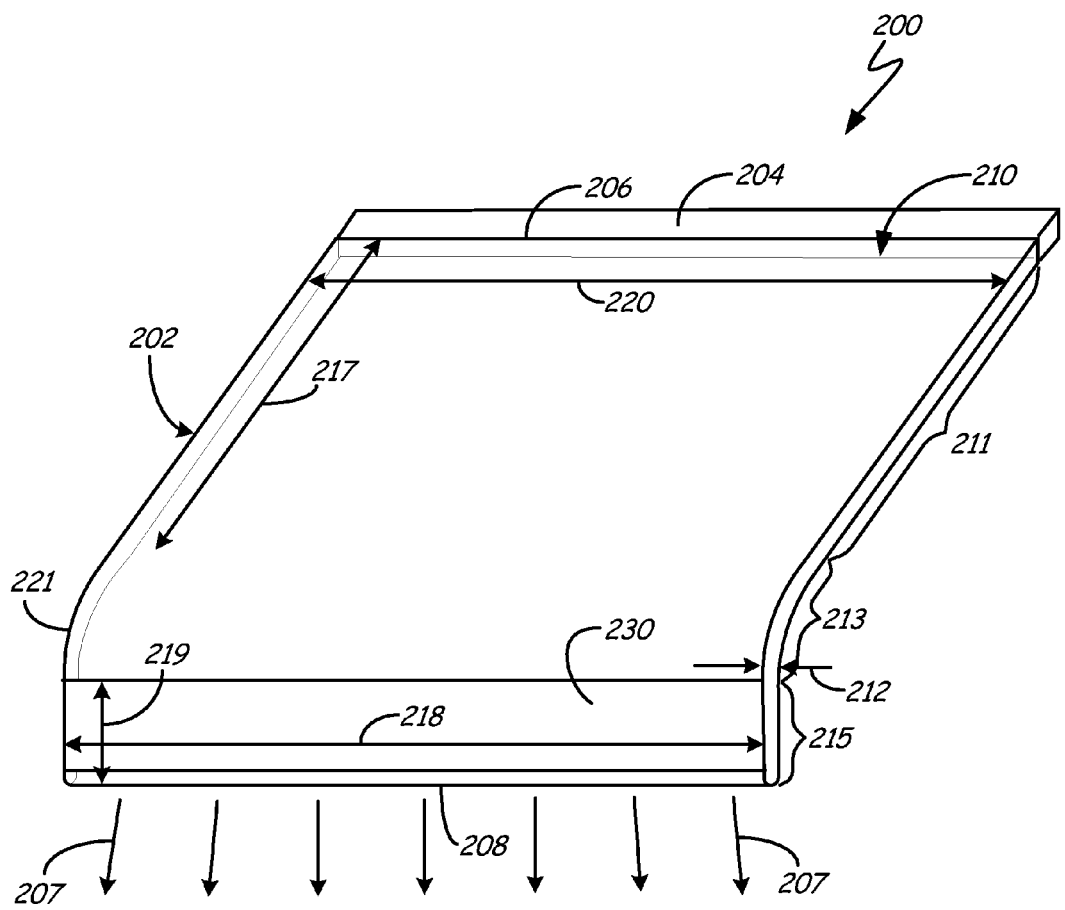
FIG. 8 illustrates a perspective view of an edge-lit lighting product in accordance with yet another embodiment.

FIG. 8 illustrates a perspective view of an exemplary edge-lit lighting product 200 in accordance with another embodiment. More specifically, FIG. 8 illustrates edge-lit lighting product 200 having a light source that is located remotely from or spaced apart from a location where light (illustrated as arrowed lines 207) is emitted. Edge-lit lighting product 200 is similar to edge-lit lighting product 100 in that it includes a light guide or substrate 202 made of a single, transparent material, a light source 204, a proximal edge or base edge 206 that receives light from light source 204 and a distal edge or free edge 208 that emits at least a portion of the light received from light source 204. A boundary surface 210 located on both sides of light guide 202 extends between proximal edge 206 and distal edge 208 and defines a boundary between the single, transparent material of light guide 202 and the surrounding environment. At least a portion of boundary surface 210 is curved.

The single, transparent material of light guide or substrate 202 demonstrates properties of TIR with respect to its surrounding environment (i.e., an index of refraction of the single, transparent material is greater than an index of refraction of the surrounding environment). For example, the single, transparent material can be an optical grade acrylic, glass or polycarbonate and the surrounding environment can be air. However, other materials and other types of surrounding environments with similar properties may be used. In addition, the single, transparent material of light guide or substrate 202 can be formed using any of a variety manufacturing processes. For example, light guide or substrate 202 can be formed by thermoforming or by other types of molding including injection molding, blow molding or rotational molding.

Light guide or substrate 202 can also be defined as including a base section 211, a curved section 213 and an elongated section 215. Base section 211 includes proximal edge or base edge 206 for receiving light from light source 204 and extends for a base section length 217. As illustrated, base section 211 extends along a linear path and provides the support structure of exemplary edge-lit lighting product or luminaire 200. In addition, base section 211 can be further structurally supported from the bottom to act as a shelf. Elongated section 215 includes distal edge or free edge 208 for emitting light from light source 204 and extends for an elongated section length 219. As illustrated, elongated section 215 also extends along a linear path. Curved section 213 couples the base section 211 to the elongated section 215 and includes at least one curve 221.

As illustrated in FIG. 8, the single, transparent material of light guide or substrate 202 includes a thickness 212. As also illustrated, distal edge or free edge 208 has a substantially axial symmetric surface, while proximal edge or base edge 206 has a substantially flat proximal edge surface. More particularly, when light from light source 204 is projected into light guide 202 at proximal edge 206, the light is oriented substantially normal or perpendicular to the proximal edge surface.

Distal edge 208 of light guide or substrate 202 spans across a first distance 218, while proximal edge 206 of light guide or substrate 202 spans across a second distance 220 (FIG. 5). In one embodiment, both first distance 218 and second distance 220 are greater than thickness 212 of light guide or substrate 202. While in some embodiments first distance 218 and second distance 220 can be circumferential dimensions as is the case in the embodiment illustrated in FIGS. 1-7, in the embodiment illustrated in FIG. 8, first distance 218 and second distance 220 are rectilinear dimensions. In addition, while in some embodiments first distance 218 is less than second distance 220 or first distance 218 is greater than second distance 220, in regards to exemplary edge-lit lighting product 200, first distance 218 is substantially similar to second distance 220.

Although not specifically illustrated in FIG. 8, at least a portion of boundary surface 210 of light guide or substrate 202 between proximal edge or base edge 206 and distal edge or free edge 208 is screen printed. For example, either side of boundary surface 210 of elongated section 215 can be screen printed 230. Screen printing boundary surface 210 of light guide 202 can visually enhance the loss of light from light guide 202 whether the loss of light is caused by the a light beam in the light guide having an incidence angle that is less than the critical angle, caused by a change in the critical angle due to a change in media or caused by some other reason. Screen printing 230 can be any of a variety of colors and patterns including white.

Although not specifically illustrated in FIG. 8, at least a portion of light guide or substrate 202 between proximal edge or base edge 206 and distal edge or free edge 208 can include one or more decals affixed to boundary surface 210. The one or more decals can enhance the loss of light from light guide 202 whether the loss of light is caused by a light beam in the light guide having an incidence angle that is less than the critical angle, caused by a change in the critical angle due to a change in media or caused by some other reason. The one or more decals can be made of vinyl and be adhered to either side of boundary surface 210 using an adhesive. In addition, decals can be any of variety colors or patterns including white.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An edge-lit lighting product comprising:
    a light guide made of a single, transparent material that demonstrates properties of total internal reflection (TIR) with respect to a surrounding environment, the light guide having a thickness and comprising:
        a proximal edge for receiving light from a light source;
        a distal edge spaced apart from the proximal edge and configured to emit at least a portion of the light from the light source to illuminate an area in close proximity to the edge-lit lighting product, the distal edge spanning across a first distance and having a substantially axial symmetric surface, wherein the first distance is greater than the thickness of the light guide; and
        a boundary surface extending between the proximal edge and the distal edge and defining a boundary between the single, transparent material of the light guide and the surrounding environment of the light guide, wherein at least a portion of the boundary surface is curved; and
        wherein the proximal edge spans across a second distance, the second distance being greater than the thickness of the material of the light guide, but less than the first distance of the distal edge.

2. The edge-lit lighting product of claim 1, wherein the single, transparent material of the light guide includes a refractive index greater than a refractive index of the surrounding environment and at least a portion of the light traveling through the light guide strikes the boundary at an angle of incidence that is greater than a critical angle of incidence so that the portion of light traveling through the light guide reflects back into the light guide at the boundary.

3. The edge-lit lighting product of claim 1, wherein the axial symmetric surface of the distal edge comprises a radius of curvature of r, wherein the thickness of the light guide is twice the thickness of r and the first distance is greater than twice the thickness of r.

4. The edge-lit lighting product of claim 1, wherein the boundary surface comprises a first curve having a first radius of curvature and a second curve having a second radius of curvature.

5. The edge-lit lighting product of claim 4, wherein the first radius of curvature of the first curve is substantially equal to about 2.25 inches and wherein the second radius of curvature of the second curve is substantially equal to about 1.25 inches.

6. The edge-lit lighting product of claim 1, further comprising at least one decal affixed to the boundary surface of the light guide and located between the proximal edge and the distal edge, the at least one decal configured to visually enhance a loss of light in the light guide.

7. The edge-lit lighting product of claim 1, further comprising screen printing at least a portion of the boundary surface of the light guide between the proximal edge and the distal edge, the screen printing configured to visually enhance a loss of light in the light guide.

8. A luminaire comprising:
    a substrate made of a single, transparent material and having a boundary surface that defines a boundary between the single, transparent material of the substrate and a surrounding environment of the substrate, the substrate having a thickness and comprising:
        a base section including a base end that extends along a plane and receives light from a light source;
        an elongated section including a free end configured to emit at least a portion of the light from the light source, the free end spanning across a first distance and having a substantially axial symmetric surface, wherein the first distance is greater than the thickness of the substrate; and
        a curved section coupling the elongated section to the base section and having a first curve including a first radius of curvature and a second curve including a second radius of curvature, wherein the first curve and the second curve bend the substrate so that the free end of the elongated section emits the light from the light source in a direction that intersects with the plane that the base end of the base section extends along;
        wherein the base section, the curved section and the elongated section guide the light received from the light source at the base end to the free end using properties of total internal reflection (TIR) with respect to the surrounding environment.

9. The luminaire of claim 8, wherein the base end spans across a second distance, the second distance being greater than the thickness of the single, transparent of the substrate, but less than the first distance of the free end.

10. The luminaire of claim 9, wherein the first distance of the free end comprises a circumferential dimension, the first distance being greater than the thickness of the substrate.

11. The luminaire of claim 10, wherein the second distance of the base end comprises a circumferential dimension, the second distance being less than the first distance.

12. The luminaire of claim 8, further comprising at least one decal affixed to the boundary surface of the substrate, the at least one decal configured to visually enhance a loss of light in the substrate.

13. The luminaire of claim 8, further comprising screen printing on at least a portion of the boundary surface of the substrate, the screen printing configured to visually enhance a loss of light in the substrate.

14. The luminaire of claim 8, wherein the single, transparent material of the substrate is selected from the group consisting of acrylic and glass.

15. A method of illuminating a space, the method comprising:
projecting light from a light source through a proximal edge of a substrate made of a single, transparent material and having a thickness, the substrate including a boundary surface defining a boundary between the single, transparent material and an environment surrounding the single, transparent material;
guiding the light through the substrate using properties of total internal reflection (TIR), wherein at least a portion of the boundary surface is curved; and
emitting at least a portion of the light traveling through the substrate at a distal edge of the substrate, the distal edge being located remotely from the proximal edge and spanning across a first distance, wherein the first distance is greater than the thickness of the substrate; and
wherein the proximal edge spans across a second distance, the second distance being greater than the thickness of the single, transparent material of the substrate, but less than the first distance of the free edge.

16. The method of claim 15, wherein guiding the light through the substrate using properties of TIR comprises guiding the light through a first curve and a second curve in the substrate, the first curve having a first radius of curvature and the second curve having a second radius of curvature.

17. The method of claim 15, further comprising affixing at least one decal to at least a portion of the boundary surface of the substrate between the proximal edge and the distal edge or screen printing to at least a portion of the boundary surface of the substrate between the proximal edge and the distal edge to visually enhance a loss of light in the substrate.

18. The method of claim 15, further comprising rounding the distal edge so as to create a substantially axial symmetric surface, the substantially axial symmetric surface having a radius r, the thickness of the substrate being 2r and the first distance being at least 4r.

\* \* \* \* \*